United States Patent
Bolzmann et al.

(10) Patent No.: US 6,859,700 B2
(45) Date of Patent: Feb. 22, 2005

(54) METHOD FOR FUNCTIONAL TESTING OF A LATERAL-ACCELERATION SENSOR

(75) Inventors: Oliver Bolzmann, Hannover (DE); Ralf Koschorek, Hannover (DE)

(73) Assignee: Wabco GmbH & Co. oHG, Hannover (DE)

( * ) Notice: Subject to any disclaimer, the term of this patent is extended or adjusted under 35 U.S.C. 154(b) by 50 days.

(21) Appl. No.: 10/325,727

(22) Filed: Dec. 20, 2002

(65) Prior Publication Data

US 2003/0149516 A1 Aug. 7, 2003

(30) Foreign Application Priority Data

Dec. 24, 2001 (DE) .......................................... 101 64 108

(51) Int. Cl.[7] ........................ G01P 21/00; B60G 17/015
(52) U.S. Cl. .............................. 701/34; 701/72; 702/116
(58) Field of Search ............................ 701/34, 72, 38; 702/116; 73/118.1; 280/5.502, 5.507

(56) References Cited

U.S. PATENT DOCUMENTS

| | | | |
|---|---|---|---|
| 4,895,021 A | | 1/1990 | Ishizeki |
| 6,092,005 A | * | 7/2000 | Okada .......................... 701/1 |
| 6,138,066 A | * | 10/2000 | Guo et al. ..................... 701/38 |
| 6,438,464 B1 | * | 8/2002 | Woywod et al. ................ 701/1 |
| 6,484,074 B1 | * | 11/2002 | Hazard et al. ................. 701/19 |
| 2002/0002859 A1 | * | 1/2002 | Gesele et al. .............. 73/117.2 |

FOREIGN PATENT DOCUMENTS

| | | |
|---|---|---|
| DE | 198 14 357 A1 | 10/1999 |
| DE | 199 36 596 C1 | 1/2001 |
| EP | 1 227 328 A1 | 7/2002 |
| JP | 08062249 A | 3/1996 |
| JP | 08062249 * | 3/1996 |
| JP | 2000283996 A | 10/2000 |

* cited by examiner

Primary Examiner—Tan Q. Nguyen
(74) Attorney, Agent, or Firm—Kramer Levin Naftalis & Frankel LLP

(57) ABSTRACT

A method for functional testing of a lateral-acceleration sensor in a vehicle equipped with a dynamic stability control system. To simulate dynamic acceleration during driving on a curve, the sensor is checked by gravitational acceleration under static conditions. The method involves positioning the vehicle on a transverse ramp with known angle of inclination and comparing the acceleration force measured by the lateral-acceleration sensor with a preset sensor value determined on the basis of the angle of inclination of the ramp. The comparison is performed on the basis of amplitude and sign, and installation errors can be diagnosed based on an error log.

14 Claims, 2 Drawing Sheets

METHOD FOR FUNCTIONAL TESTING OF A LATERAL-ACCELERATION SENSOR

BACKGROUND OF THE INVENTION

The present invention relates generally to a method for functional testing of a lateral-acceleration sensor in a vehicle equipped with a dynamic stability control system.

DE 199 36 596 C1 generally describes the functional testing of a dynamic stability control sensor system comprising a yaw-rate sensor, a lateral-acceleration sensor and/or a steering-angle sensor during a vehicle test drive that includes driving at specified longitudinal velocity on a curve. For this purpose, the values of the measured signals being received from the dynamic stability control sensor system at the beginning of a test process are recorded as the starting values. During the test drive of the vehicle, which takes place under specified conditions, the values of the measured signals being delivered continuously by the dynamic stability control electronics are compared with the associated starting values. In particular, these are the values delivered while the vehicle is being driven on the curve at a longitudinal velocity within a predetermined velocity range. For such driving conditions, the measured signals of the sensors in question are within characteristic ranges in the error-free case. From subsequent evaluation of the results of the measured signals delivered during the test drive compared with the associated starting values, it is possible to determine whether the dynamic stability control sensor system is functioning without errors.

The method according to DE 199 36 596 C1, therefore, requires that the vehicle be driven on a curve under specified conditions. This is problematic if the test must be performed as an inspection at the end of the assembly line, that is, promptly after completion of the vehicle on the assembly line. The manufacturing facilities themselves often lack the space needed for driving on a curve, and disadvantages are also associated with specifying driving maneuvers in the proving ground. Varying weather conditions sometimes cause low coefficients of friction, due to ice and snow, for example, leading to vehicle instabilities which, in turn, falsify the measured result of driving on a curve, and thus cause incorrect detection of errors. This can lead to problems in the course of series production, because the manufacturing process is then delayed, causing additional costs. Allowance for such effects could be made by broadening error margins, but the detection capability would be undesirably reduced.

Accordingly, it is desired to provide a method for functional testing of a lateral-acceleration sensor in a vehicle equipped with a dynamic stability control system that improves over prior art approaches.

SUMMARY OF THE INVENTION

Generally speaking, in accordance with the present invention, an improved method for functional testing of a lateral-acceleration sensor in a vehicle equipped with a dynamic stability control system is provided.

In a preferred embodiment of the method according to the present invention, the dynamic stability control system includes an electronic dynamic stability controller. A level test surface suitable for accommodating the vehicle to simulate the driving position on a level road surface is provided. The output of the lateral-acceleration sensor is measured when the vehicle is in driving position on the level test surface to determine the sensor value that is valid for driving in a straight line. The vehicle is then tilted such that its entire length is disposed at a preselected angle of inclination transverse to the driving direction to simulate the driving position on a curved road surface. The output of the lateral-acceleration sensor is measured when the vehicle is in tilted position to determine the sensor value that is valid for driving on a curve. A preset sensor value corresponding to gravitational acceleration acting on the lateral-acceleration sensor at the preselected angle of inclination is then calculated. The amplitude and sign of the sensor value that is valid for driving on a curve is then compared with the amplitude and sign of the calculated preset sensor value.

In another embodiment of the present invention, automatic logging takes place via diagnostic means.

In a further embodiment of the present invention, the diagnostic means are integrated into an electronic dynamic stability controller that is already present in any case, and thus can be implemented particularly inexpensively.

Accordingly, it is an object of the present invention to provide a method for functional testing of a lateral-acceleration sensor in a vehicle equipped with a dynamic stability control system that is greatly simplified compared to prior art approaches.

It is also an object of the present invention to provide a method for functional testing of a lateral-acceleration sensor in a vehicle equipped with a dynamic stability control system that can be performed as part of a vehicle inspection process conducted promptly after completion of the vehicle on the assembly line.

It is another object of the present invention to provide a method for functional testing of a lateral-acceleration sensor in a vehicle equipped with a dynamic stability control system that can be performed in a limited space, including in an enclosed space.

It is an additional object of the present invention to provide a method for functional testing of a lateral-acceleration sensor in a vehicle equipped with a dynamic stability control system that can be implemented easily and cost-effectively.

It is a further object of the present invention to provide a method for functional testing of a lateral-acceleration sensor in a vehicle equipped with a dynamic stability control system wherein dynamically acting centrifugal acceleration applicable for certain conditions of driving on a curve (curve radius and vehicle velocity) can be simulated on a stationary vehicle based on gravitational acceleration.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

A vehicle electronic dynamic stability control system is used to maintain control in critical driving situations caused by lateral dynamic effects. For this purpose, the dynamic stability control electronics records, via sensors, the steering wheel turning angle, which indicates where the driver intends to steer the vehicle, the turning rate, which indicates how rapidly the vehicle is turning at any given instant, and the lateral acceleration, which describes the force transmission allowed by the existing coefficient of friction. On the basis of this information, the control electronics determines whether the vehicle is following the steering commands or whether it is being oversteered or understeered relative to the existing velocity on the curve. If incorrect behavior due to oversteering or understeering is observed, certain vehicle wheels are braked to counteract this incorrect behavior, and, thus, to prevent the driver and vehicle from being overwhelmed by a dangerous, critical driving situation.

Figure 1:
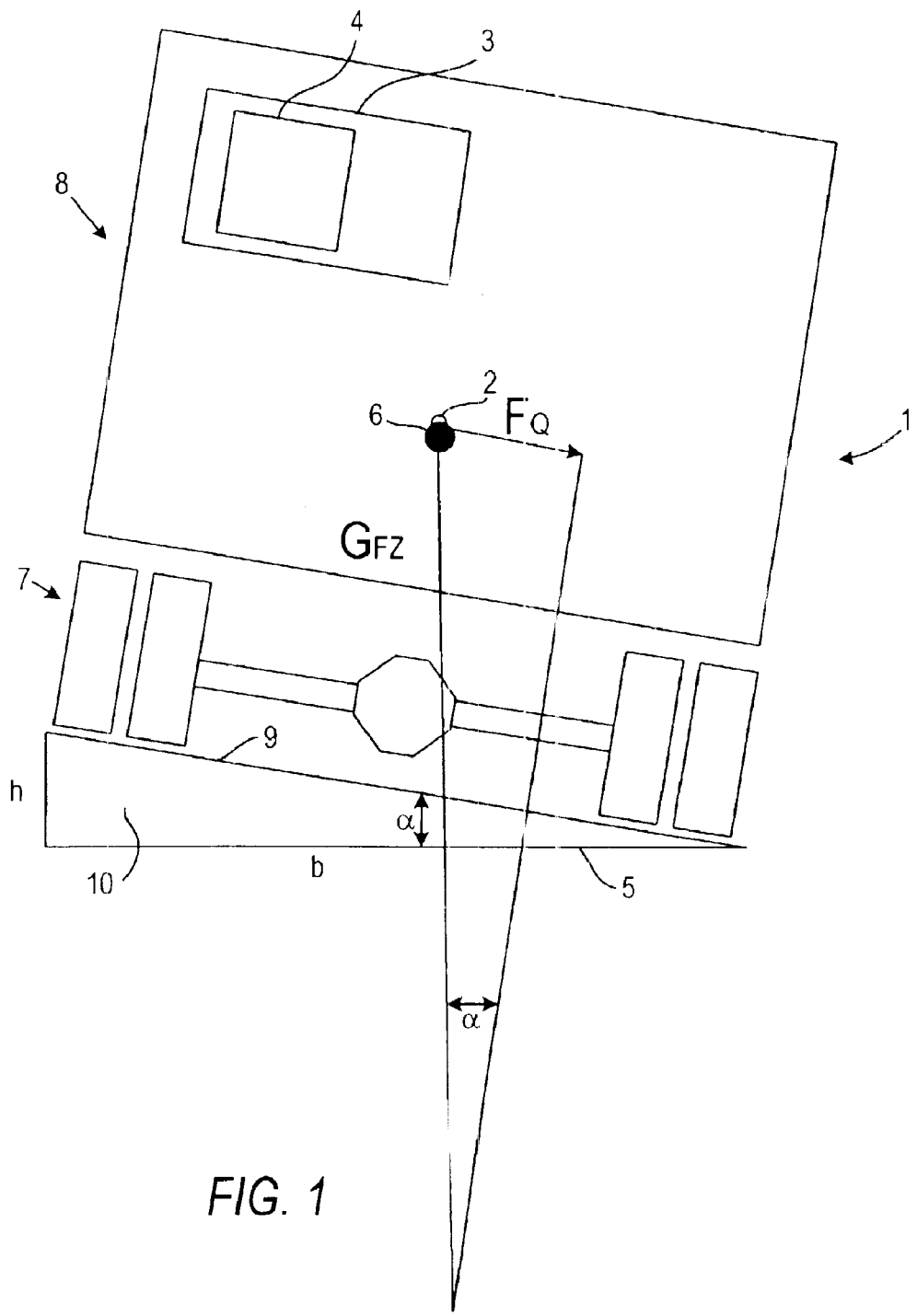
FIG. 1 is a schematic diagram showing a vehicle equipped with a dynamic stability control system undergoing functional testing of a lateral-acceleration sensor according to a preferred embodiment of the method of the present invention.

Referring now to the drawings, FIG. 1 shows a vehicle 1 including a vehicle body 8 braced on vehicle axles 7. Vehicle 1 is equipped with a dynamic stability control system 3 including an electronic dynamic stability controller 4.

Vehicle 1 is disposed on a transverse ramp 10 having an angle of inclination α. Vehicle axles 7 rest on an inclined surface 9 of transverse ramp 10. By virtue of the geometry of transverse ramp 10, the angle of inclination α can be determined from the width b (fixed by the vehicle track width, such as, for example, 2.05 m) and by the height h (such as, for example, 0.25 m) according to the following relationship:

$$\alpha = \arctan\frac{h}{b} \quad [1]$$

A lateral-acceleration sensor 2 (such as, for example, an SCA 320 Accelerometer of the VTI Co., Hamlin) is preferably disposed at the vehicle's center of gravity 6, so that the vehicle's weight $G_{Fz}$ acts at this point. Because of the tilted orientation of vehicle 1, a partial component of weight $G_{Fz}$, or in other words the force $F_Q$ acting as the force of lateral acceleration, acts on lateral-acceleration sensor 2 in its measurement direction, parallel to the vehicle axle. According to the well-known parallelogram law of forces, the force $F_Q$ can be obtained from the trigonometric relationship:

$$F_Q = G_{Fz} \cdot \sin\alpha \quad [2]$$

With the gravitational acceleration g=9.81 M/s² and the vehicle mass $m_{Fz}$, the force $F_Q$ can be calculated as follows:

$$F_Q = g \cdot m_{Fz} \cdot \sin\alpha \quad [3]$$

and a preset sensor value $b_v$ corresponding to the angle of inclination can be defined by the following relationship:

$$b_v = g \cdot \sin\alpha \quad [4]$$

The preset sensor value determined by equation [4] can now be used as the comparison value for the functional test of lateral-acceleration sensor 2 according to the method of the present invention.

According to the present invention, the dynamically acting centrifugal acceleration $b_{dyn}$ applicable for certain conditions of driving on a curve (curve radius and vehicle velocity) can be simulated with the preset sensor value $b_v$ according to equation [4] by the statically acting gravitational acceleration g. Instead of determining $b_{dyn}$ by driving on a curve, measurements are performed on stationary vehicle 1 and the measured result is compared with $b_v$ according to equation [4], thus greatly simplifying the entire test procedure.

Besides the transverse ramp 10 shown in FIG. 1, vehicle 1 can also be positioned in a tilted orientation by other means, such as, for example, a hydraulically actuated lifting mechanism that tilts the vehicle by lifting one side. It should be understood that all means capable of positioning vehicle 1 in an orientation in which the gravitational acceleration acting on the lateral-acceleration sensor simulates driving on a curve can be considered to be equivalent to transverse ramp 10.

Figure 2:
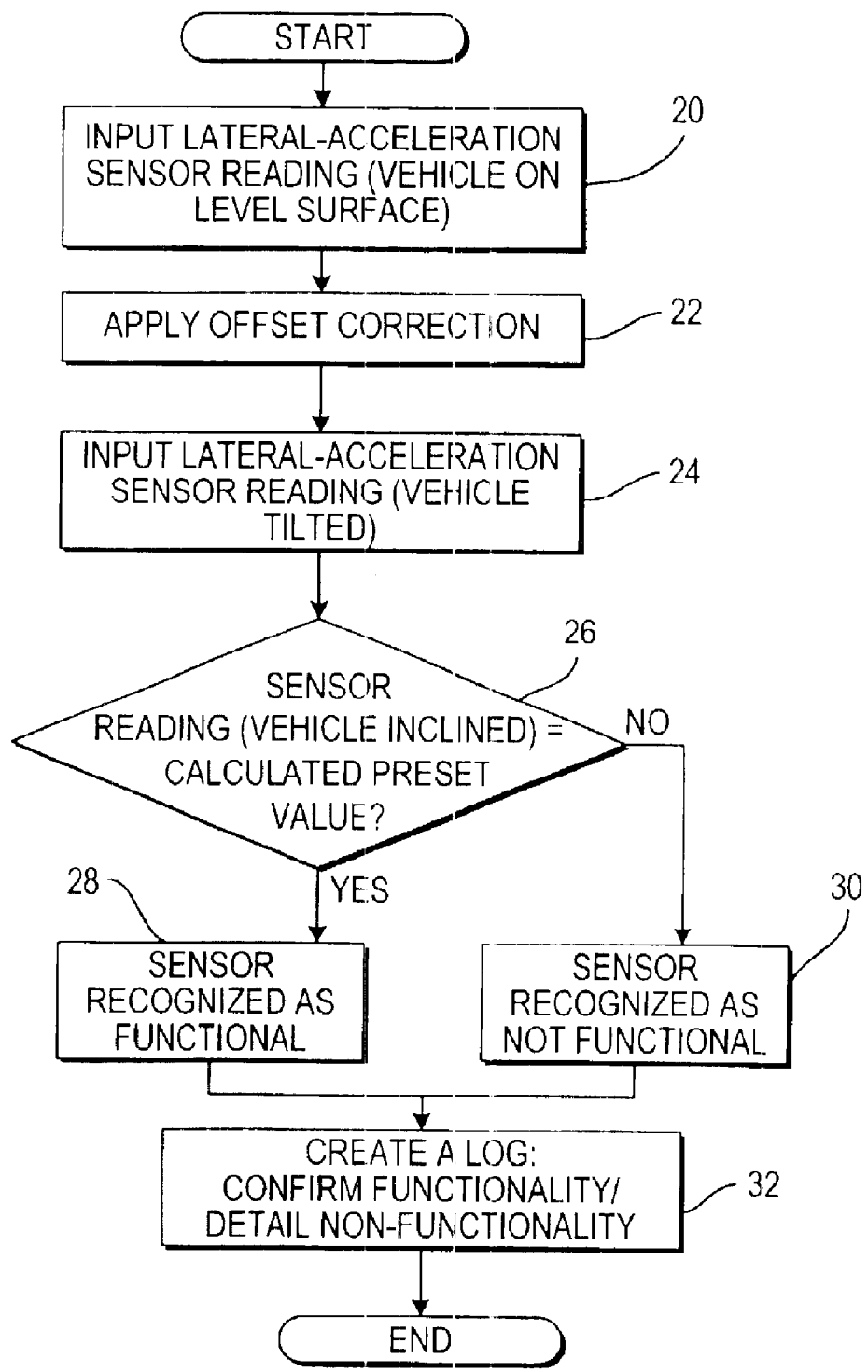
FIG. 2 is a flow chart depicting process steps for functional testing of a lateral-acceleration sensor in a vehicle equipped with a dynamic stability control system according to a preferred embodiment of the method of the present invention.

Referring now to FIG. 2, after vehicle 1 has been completed on the assembly line, it is placed on a level surface 5 such as the floor of the manufacturing facility. In this position, a lateral-acceleration sensor reading is taken and input into dynamic stability controller 4 of the vehicle's dynamic stability control system 3 (step 20). From this reading, an offset is preferably determined for calibration purposes. The offset is the sensor reading corresponding to the action of a lateral-acceleration force of zero, as is the case in this position.

In step 22, an offset correction is preferably applied, by subtracting it from or adding it to all subsequently measured sensor readings as appropriate. Sensor readings, purged of offset, are therefore used for the functional test according to the method of the present invention.

Vehicle 1 is then positioned onto transverse ramp 10 discussed above, so that all axles 7 rest on inclined surface 9. It should be appreciated that instead of being driven onto transverse ramp 10, the vehicle can also be towed onto transverse ramp 10 by a cable system, for example, if it is not desirable to start the vehicle engine during the functional test.

The sensor reading is input in step 24. In step 26, a check is made of whether the sensor reading determined by lateral-acceleration sensor 2 is equal in amplitude and sign to the preset sensor value according to equation [4].

If the observed lateral acceleration corresponds in amplitude and sign to the preset sensor value, it is recognized that the acceleration sensor has been installed so as to function properly (step 28). In contrast, if the lateral acceleration observed in tilted orientation does not correspond in amplitude and sign to the preset sensor value, it is recognized that the installed lateral-acceleration sensor 2 is not functional (step 30). The check of equality is desirably performed by dynamic stability controller 4 itself, which for this purpose is preferably provided with suitable diagnostic software.

This diagnostic software can then be used to create a log (step 32) which confirms the functionality if lateral-acceleration sensor 2 has been functionally installed and indicates details of the type of error if the lateral-acceleration sensor has not been functionally installed. In this way it is possible, for example, to diagnose a simple wiring error, as is the case if the sensor is delivering the correct amplitude but the incorrect sign.

The log can be advantageously output via an on-board display, which is installed in any case in the vehicle. Alternatively, or additionally, the log can be output, via an interface mounted on electronic dynamic stability controller 4, to a printing device connected thereto, in order to produce a hard copy. Automatic logging is also possible in this way. The log information can also be relayed via this interface to a process computer for automatic logging.

It is also possible to display the sensor reading determined by lateral-acceleration sensor 2 in tilted position on a display or diagnostic test instrument for visual comparison (preferably in units of m/s$^2$). However, this can result in higher test costs, as automation of the sequence is largely ruled out.

Besides its use for inspections at the end of the assembly line after completion of the vehicle, the test method according to the present invention can also be used for functional testing of the lateral-acceleration sensor during a general inspection by an authorized inspection agency. Since such inspections are usually conducted under limited space conditions, it is also highly advantageous for this purpose that the space requirement for use of the inventive test method is small.

As an example, testing by an authorized inspection agency can be performed with the hydraulically actuated lifting mechanism discussed above (in the form of a prop on the piston arm of one or more hydraulic cylinders), since such lifting devices are standard in any case for other types of tests in the field. It should be understood that various other options for achieving a tilted orientation of the vehicle are available in this connection; examples are the use of a crane or of car jacks, or the use of a pneumatic suspension system built into the vehicle—in the latter case, the use of a kneeling mechanism is particularly advantageous for buses.

Accordingly, the present invention provides a method for functional testing of a lateral-acceleration sensor in a vehicle equipped with a dynamic stability control system wherein dynamically acting centrifugal acceleration applicable for certain conditions of driving on a curve (curve radius and vehicle velocity) can be simulated on a stationary vehicle easily and cost-effectively and in a limited space.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for functional testing of a lateral-acceleration sensor in a vehicle equipped with a dynamic stability control system including an electronic dynamic stability controller, comprising the steps of providing a level test surface suitable for accommodating said vehicle to simulate the driving position of said vehicle on a level road surface, measuring a first output of said lateral-acceleration sensor when said vehicle is in driving position on said level test surface to determine the sensor value that is valid for driving in a straight line, said first output having an amplitude and sign, tilting said vehicle such that its entire length is disposed at a preselected angle of inclination transverse to the driving direction to simulate the driving position of said vehicle on a curved road surface, measuring a second output of said lateral-acceleration sensor when said vehicle is in tilted position to determine the sensor value that is valid for driving on a curve, said second output having an amplitude and sign, calculating a preset sensor value simulating dynamically acting centrifugal acceleration by gravitational acceleration statically acting on said lateral-acceleration sensor at said preselected angle of inclination, said preset sensor value having an amplitude and sign, and comparing the amplitude and sign of said second output with the amplitude and sign of said calculated preset sensor value.

2. The method according to claim 1, wherein the preset sensor value is calculated based on said preselected angle of inclination.

3. The method according to claim 1, further comprising the step of recognizing functional installation of said lateral-acceleration sensor when said output of said sensor changes with a change in position of said vehicle from level to tilted position and said output of said sensor becomes equal in amplitude and sign to said preset sensor value when said vehicle is positioned at said predetermined angle of inclination.

4. The method according to claim 3, further comprising the step of displaying said output of said lateral-acceleration sensor via a display device connected to said electronic dynamic stability controller.

5. The method according to claim 4, wherein said display device is an on-board display installed in said vehicle.

6. The method according to claim 3, further comprising the step of displaying said output of said lateral-acceleration sensor via a diagnostic test instrument connected to said electronic dynamic stability controller.

7. The method according to claim 1, wherein said steps of providing a level test surface for said vehicle, measuring a first output of said lateral-acceleration sensor, tilting said vehicle, measuring a second output of said lateral-acceleration sensor, calculating a preset sensor value and comparing said second output and said preset sensor value are effected as an inspection conducted at the end of an assembly line on which said vehicle has been completed.

8. The method according to claim 1, wherein said steps of providing a level test surface for said vehicle, measuring a first output of said lateral-acceleration sensor, tilting said vehicle, measuring a second output of said lateral-acceleration sensor, calculating a preset sensor value and comparing said second output and said preset sensor value are effected as part of a general inspection by an authorized inspection agency.

9. The method according to claim 1, wherein said step of tilting said vehicle is effected by positioning said vehicle on a transverse ramp having said predetermined angle of inclination.

10. The method according to claim 9, further comprising the steps of inputting said measured sensor value valid for driving in a straight line into said electronic dynamic stability controller, applying an offset correction for said input sensor value, inputting said measured sensor value valid for driving on a curve into said electronic dynamic stability controller, utilizing said dynamic stability controller to compare said input sensor value valid for driving on a curve in amplitude and sign with said preset sensor value, and generating a log via said dynamic stability controller.

11. A method for functional testing of a lateral-acceleration sensor in a vehicle equipped with a dynamic stability control system including an electronic dynamic stability controller, comprising the steps of providing a level test surface suitable for accommodating said vehicle to simulate the driving position of said vehicle on a level road surface, measuring a first output of said lateral-acceleration sensor when said vehicle is in driving position on said level test surface to determine the sensor value that is valid for driving in a straight line, said first output having an amplitude and sign, tilting said vehicle such that its entire length is disposed at a preselected angle of inclination transverse to the driving direction to simulate the driving position of said vehicle on a curved road surface, measuring a second output of said lateral-acceleration sensor when said vehicle is in tilted position to determine the sensor value that is valid for driving on a curve, said second output having an amplitude and sign, calculating a preset sensor value corresponding to gravitational acceleration acting on said lateral-acceleration sensor at said preselected angle of inclination, said preset sensor value having an amplitude and sign, comparing the amplitude and sign of said second output with the amplitude and sign of said calculated preset sensor value, recognizing functional installation of said lateral-acceleration sensor when said output of said sensor changes with a change in position of said vehicle from level to tilted position and said output of said sensor becomes equal in amplitude and sign to said preset sensor value when said vehicle is positioned at said predetermined angle of inclination, and generating a log using diagnostic software, said log providing at least one of a confirmation that said lateral-acceleration sensor has been functionally installed and an indication that said lateral-acceleration sensor has not been functionally installed, said indication that said lateral-acceleration sensor has not been functionally installed including information as to the details of errors associated with said sensor.

12. The method according to claim 11, wherein said diagnostic software includes an algorithm that is processed by said electronic dynamic stability controller.

13. The method according to claim 11, further comprising the step of outputting said log via an on-board display installed in said vehicle.

14. The method according to claim 11, further comprising the step of outputting said log via a hard-copy device adapted to be connected to said electronic dynamic stability controller.

* * * * *